Patented Feb. 13, 1951

2,541,670

UNITED STATES PATENT OFFICE 2,541,670

REACTION PRODUCTS OF 4-VINYLCYCLO-HEXENE DIOXIDE

Gordon Hart Segall and Owen Clement Wentworth Allenby, McMasterville, Quebec, Canada, assignors to Canadian Industries Limited, Montreal, Quebec, Canada, a corporation of Canada No Drawing. Application May 19, 1949, Serial No. 94,256. In Canada February 20, 1948

6 Claims. (Cl. 260—348)

This invention relates to new compositions of matter. More particularly it relates to new hydroxy esters. Still more particularly, it relates to monohydroxy monoester oxides and dihydroxy diesters obtained from 4-vinylcyclohexene dioxide and carboxylic acids.

4-vinylcyclohexene dioxide, a compound having the structure

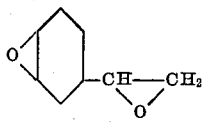

may be prepared by reacting 4-vinylcyclohexene with hypochlorous acid whereby 4-vinylcyclohexene dichlorohydrins are obtained, and by dehydrohalogenating the dichlorohydrins to obtain the dioxide. Because of the presence of two epoxide rings in its molecule, it would be expected that 4-vinylcyclohexene dioxide would react readily with carboxylic acids like other known organic epoxy compounds and thus give monohydroxy mono-ester oxides and dihydroxy diesters according to the following equations:

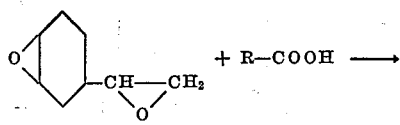

and/or

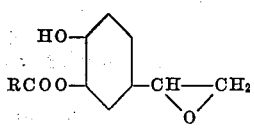

and/or

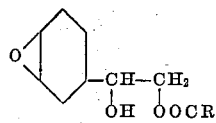

and/or

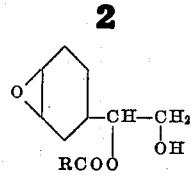

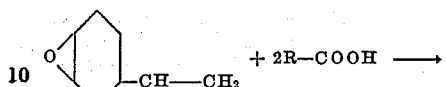

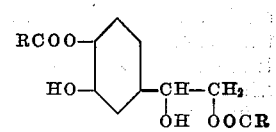

and/or

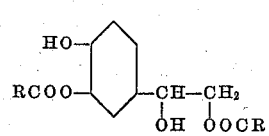

and/or

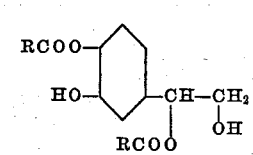

and/or

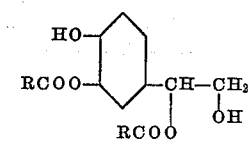

Nowhere in the literature, however, is reference made of the above esters. Furthermore, in the absence of catalysts, or in the presence of inefficient catalysts such as the usual esterification catalysts or primary, secondary, or tertiary amines, or in the presence of insufficient amounts of efficient catalysts, the reaction between carboxylic acids and 4-vinylcyclohexene dioxide does not result in the formation of monohydroxy monoester oxides and dihydroxy diesters. When equimolecular proportions of acid and dioxide are reacted under any of the above conditions, for instance, the products contain only about half the oxide required for monohydroxy monoester oxides. Since the analysis for active hydrogen content and molecular weight found are in accord with that of monohydroxy monoesters, and the products contain a negligible amount of carbonyl groups, which are possible products of oxide rearrangement, it has been inferred that roughly half the oxide groups are lost by intramolecular reaction between the hydroxyl groups and the epoxide groups to form internal ethers, probably tetrahydropyran rings. An example of such intramolecular reaction is given by the following equation:

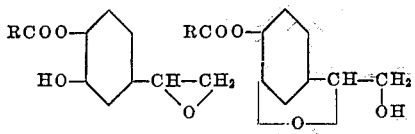

It has been found that when catalysts such as trimethylbenzylammonium hydroxide, tetramethylammonium hydroxide, guanidine, potassium or lithium hydroxides are used in concentrations of from one to eight per cent of the weight of the reactants, monohydroxy monoester oxides or dihydroxy diesters may be obtained readily depending on the molar amount of carboxylic acids which are reacted with 4-vinylcyclohexene dioxide.

It is therefore an object of this invention to provide hydroxy esters from 4-vinylcyclohexene dioxide and carboxylic acids. Another object is to provide monohydroxy monoester oxides and dihydroxy diesters from 4-vinylcyclohexene dioxide and carboxylic acids. A further object is the provision of a process for the preparation of these esters. Other objects will appear hereinafter.

These and other objects are accomplished by the invention hereinafter described which broadly comprises reacting 4-vinylcyclohexene dioxide with carboxylic acids of the general formula R—COOH, wherein R is an organic radical, in the presence of a catalyst selected from the group consisting of strong inorganic and organic bases.

Mor particularly, this invention may be described as follows. One or two mols of a carboxylic acid are mixed with a catalyst selected from the group consisting of strong inorganic and organic bases, such as trimethylbenzylammonium hydroxide, in the proportion of from 1 to 8% by weight of the reaction mixture, and then heated to a temperature of about 100°–150° C. One mol of 4-vinylcyclohexene dioxide is thereafter quickly added to the heated mixture and the esterification allowed to proceed at 100°–150° C. until completion.

The following examples are illustrative of the more detailed practice of this invention and are not to be construed as restricting or limiting the scope of the invention in any way.

Example I

To 12 g. (0.2 mol) acetic acid dissolved in 46 g. methyl isobutyl ketone, there was added 3 g. trimethylbenzylammonium acetate and the mixture was heated to 110° C. 31 g. (0.2 mol) 4-vinylcyclohexene dioxide, analyzing 90%, was then added instantaneously thereto and the temperature readjusted to 110° C. where it was maintained. The following table shows the rate of esterification through the residual acid and oxide equivalent values:

| Time | Acid equivalent | Oxide equivalent |
|---|---|---|
| 0' | 0.200 | 0.400 |
| 10' | 0.108 | 0.325 |
| 20' | 0.055 | 0.259 |
| 30' | 0.014 | 0.215 |
| 40' | 0.002 | 0.208 |

The product was a solution of 4-vinylcyclohexene monohydroxy monoacetate oxides. The neutral solution was unstable at the reaction temperature, losing oxide.

Example II 17.2 g. (0.2 mol) crotonic acid was dissolved in 53 g. methyl isobutyl ketone and 5 g. trimethylbenzylammonium crotonate added thereto. The mixture was then heated to 110° C. at which temperature 31 g. (0.2 mol) 4-vinylcyclohexene dioxide, analyzing 90%, was added and the esterification allowed to proceed. The following results were obtained:

| Time | Acid equivalent | Oxide equivalent |
|---|---|---|
| 0' | 0.200 | 0.400 |
| 10' | 0.098 | 0.308 |
| 20' | 0.046 | 0.251 |
| 30' | 0.013 | 0.231 |
| 40' | 0.006 | 0.206 |

The product was a solution of 4-vinylcyclohexene monohydroxy monocrotonate oxides. The neutral solution was unstable with respect to oxide content.

Example III

To 23 g. (0.2 mol) sorbic acid and 1 g. trimethylbenzylammonium hydroxide heated to 130° C., there was added 55 g. aromatic hydrocarbon solvent and the temperature was brought to 110° C. 31 g. (0.2 mol) 4-vinylcyclohexene dioxide, analyzing 90%, was then added and the esterification allowed to proceed at 110° C. with the following results:

| Time | Acid equivalent | Oxide equivalent |
|---|---|---|
| 0' | 0.200 | 0.400 |
| 10' | 0.134 | 0.336 |
| 20' | 0.089 | 0.289 |
| 30' | 0.050 | 0.249 |
| 40' | 0.031 | 0.232 |

The product was a solution of 4-vinylcyclohexene monohydroxymonosorbate oxides.

Example IV 54 g. (0.2 mol) stearic acid was mixed with 0.1 g. trimethylbenzylammonium hydroxide as a 40% aqueous solution and the mixture heated to 120° C. 31 g. (0.2 mol) 4-vinylcyclohexene dioxide, analyzing 90%, was then added thereto and the temperature readjusted and kept at 120° C. The following rate of esterification was observed:

| Time | Acid equivalent | Oxide equivalent |
|---|---|---|
| 0' | 0.200 | 0.400 |
| 5' | 0.134 | 0.315 |
| 15' | 0.092 | 0.243 |
| 30' | 0.062 | 0.197 |
| 60' | 0.037 | 0.160 |

The product, a wax, was 4-vinylcyclohexene monohydroxy monostearate oxides in which some intramolecular isomerization had presumably occurred.

Example V

The procedure of Example IV was repeated, but at a temperature of 150° C. instead of 120° C. with the following results:

| Time | Acid equivalent | Oxide equivalent |
|---|---|---|
| 0' | 0.200 | 0.400 |
| 15' | 0.007 | 0.123 |
| 30' | 0.002 | 0.103 |
| 60' | 0.001 | 0.098 |

The product had a chemical nature similar to that of Example IV product.

Example VI

To a mixture of 54 g. (0.2 mol) stearic acid and 1 g. trimethylbenzylammonium hydroxide (40% aqueous solution) heated to 110° C., there was added 31 g. (0.2 mol) 4-vinylcyclohexene dioxide, analyzing 90%, and after the temperature was readjusted to 110° C., the esterification was allowed to proceed. The following values of residual acid and oxide equivalents at different time intervals illustrate the rate of the reaction:

| Time | Acid equivalent | Oxide equivalent |
|---|---|---|
| 0' | 0.200 | 0.400 |
| 5' | 0.159 | 0.371 |
| 15' | 0.052 | 0.251 |
| 30' | 0.006 | 0.201 |

The product was 4-vinylcyclohexene monohydroxy monostearate oxides. It was a neutral low melting wax containing one equivalent of active hydrogen and one oxide ring per formula weight.

Example VII

The esterification of Example VI was repeated at 120° C. with the following results:

| Time | Acid equivalent | Oxide equivalent |
|---|---|---|
| 0' | 0.200 | 0.400 |
| 10' | 0.038 | 0.236 |
| 20' | 0.004 | 0.201 |
| 30' | 0.000 | 0.133 |

The product, a wax, was a mixture of unstable 4-vinylcyclohexene monohydroxy monostearate oxides and, presumably, isomerized and polymerized forms thereof.

Example VIII 54 g. (0.2 mol) stearic acid was mixed with 5 g. tetramethylammonium stearate and the mixture was heated to 120° C. 31 g. (0.2 mol) 4-vinylcyclohexene dioxide, analyzing 90%, was then added to the heated mixture and the esterification conducted at 120° C. After 10 minutes of heating, there was 0.011 residual acid equivalent and 0.218 residual oxide equivalent.

The waxy product was 4-vinylcyclohexene monohydroxy monostearate oxides.

Example IX 54 g. (0.2 mol) stearic acid was mixed with 0.1 mol quinoline and the mixture heated to 200° C. 29.5 g. (0.19 mol) 4-vinylcyclohexene dioxide, analyzing 90%, was then added thereto and the temperature maintained at 200–220° C. The following rate of esterification was observed:

| Time | Acid equivalent | Oxide equivalent |
|---|---|---|
| 0' | 0.200 | 0.380 |
| 15' | 0.007 | 0.085 |
| 60' | 0.001 | 0.070 |

The molecular weight of the product was 400, active hydrogen found 1.03, carbonyl content negligible. This material corresponded to a bicyclic compound, produced by intramolecular rearrangement of the 4-vinylcyclohexene monohydroxy monostearate oxides, said compound having a molecular weight of 410, one active hydrogen and zero oxide value.

Example X 56 g. (0.2 mol) oleic acid was mixed with 1 g. trimethylbenzylammonium hydroxide as a 40% aqueous solution and brought to a temperature of 110° C. 31 g. (0.2 mol) 4-vinylcyclohexene dioxide, analyzing 90%, was then added and the esterification allowed to proceed at 110° C. An analysis carried on the mixture after 27 minutes of heating showed 0.021 residual acid equivalent and 0.220 residual oxide equivalent.

The product consisting of 4-vinylcyclohexene monohydroxy monooleate oxides was an oil.

Example XI

To a mixture of 57 g. (0.2 mol) linseed oil acids and 1 g. trimethylbenzylammonium hydroxide (40% aqueous solution) heated to 110° C., there was added 31 g. (0.2 mol) 4-vinylcyclohexene dioxide, analyzing 90%, and the reaction was allowed to proceed at 110° C. The following results were obtained:

| Time | Acid equivalent | Oxide equivalent |
|---|---|---|
| 0' | 0.200 | 0.400 |
| 10' | 0.101 | 0.312 |
| 20' | 0.054 | 0.253 |
| 30' | 0.021 | 0.217 |
| 35' | 0.007 | 0.208 |
| 40' | 0.004 | 0.191 |

The oily product was 4-vinylcyclohexene monohydroxy linseed oil acids monoester oxides.

Example XII

An esterification similar to that of Example XI was carried on at 120° C. with the following results:

| Time | Acid equivalent | Oxide equivalent |
|---|---|---|
| 0' | 0.200 | 0.400 |
| 10' | 0.051 | 0.228 |
| 20' | 0.011 | 0.201 |
| 30' | 0.003 | 0.137 |

A product similar to that of Example XI was obtained.

Example XIII

A mixture of 57 g. (0.2 mol) linseed oil acids, 1 g. trimethylbenzylammonium hydroxide (40% aqueous solution) and 89 g. aromatic hydrocarbon solvent was heated to 120° C. at which temperature 31 g. (0.2 mol) 4-vinylcyclohexene dioxide, analyzing 90%, was added and the esterification allowed to proceed. The following results were obtained:

| Time | Acid equivalent | Oxide equivalent |
|---|---|---|
| 0' | 0.200 | 0.400 |
| 15' | 0.120 | 0.362 |
| 30' | 0.078 | 0.305 |
| 45' | 0.046 | 0.264 |
| 60' | 0.023 | 0.237 |

The mixture was afterwards heated to 145° C. for some time and an analysis for residual acid and oxide equivalent carried thereon with the following results:

| Acid equivalent | Oxide equivalent |
|---|---|
| 0.000 | 0.200 |

The product was a solution of 4-vinylcyclohexene monohydroxy linseed oil acids monoester oxides.

Example XIV

An esterification similar to that of Example XIII was made at 150° C. using 118 g. aromatic hydrocarbon solvent. The rate of the reaction was as follows:

| Time | Acid equivalent | Oxide equivalent |
|---|---|---|
| 0' | 0.200 | 0.400 |
| 10' | 0.072 | 0.278 |
| 15' | 0.041 | 0.249 |
| 30' | 0.011 | 0.209 |

There was obtained a product similar to that of Example XIII.

Example XV

To 57 g. (0.2 mol) linseed oil acids and 1.5 g. tetramethylammonium hydroxide heated to 120° C., there was added 31 g. (0.2 mol) 4-vinylcyclohexene dioxide, analyzing 90%, and the esterication was allowed to proceed at 120° C. with the following results:

| Time | Acid equivalent | Oxide equivalent |
|---|---|---|
| 0' | 0.200 | 0.400 |
| 10' | 0.130 | 0.319 |
| 20' | 0.064 | 0.234 |
| 30' | 0.032 | 0.197 |
| 40' | 0.013 | 0.181 |

The product obtained was the same as that of Example XI.

Example XVI

The procedure of Example XV was applied to 57 g. (0.2 mol) linseed oil acids, 1 g. tetramethylammonium hydroxide and 31 g. (10.2 mol) 4-vinylcyclohexene dioxide, analyzing 90%, but in the presence of 89 g. aromatic hydrocarbon solvent and at 140° C. The following results were obtained.

| Time | Acid equivalent | Oxide equivalent |
|---|---|---|
| 0' | 0.200 | 0.400 |
| 10' | 0.132 | 0.323 |
| 20' | 0.074 | 0.259 |
| 30' | 0.033 | 0.207 |

The oily product was a solution of 4-vinylcyclohexene monohydroxy linseed oil acids monoester oxides.

Example XVII 57 g. (0.2 mol) linseed oil acids were mixed with 1 g. guanidine carbonate and afterwards heated to 120° C. 31 g. (0.2 mol) 4-vinylcyclohexene dioxide, analyzing 90%, was then added and the esterification conducted at 120° C. After 35 minutes of heating, there was found 0.009 residual acid equivalent and 0.211 residual oxide equivalent.

The product was a viscous oil consisting of 4-vinylcyclohexene monohydroxy linseed oil acids monoester oxides.

Example XVIII 61 g. (0.2 mol) linseed oil acids were mixed with 1 g. potassium hydroxide and the mixture heated to 120° C. 31 g. (0.2 mol) 4-vinylcyclohexene dioxide, analyzing 90%, was then added thereto and the reaction continued at 120° C. with the following results:

| Time | Acid equivalent | Oxide equivalent |
|---|---|---|
| 0' | 0.200 | 0.400 |
| 20' | 0.037 | 0.236 |
| 30' | 0.016 | 0.218 |
| 40' | 0.006 | 0.207 |
| 50' | 0.003 | 0.200 |

The chemical nature of the product was the same as that of Example XVII product.

Example XIX

The procedure of Example XVIII was applied to 62.7 g. (0.2 mol) linseed oil acids, 0.5 g. lithium hydroxide and 31 g. (0.2 mol) 4-vinylcyclohexene dioxide, analyzing 90%. The following results were obtained:

| Time | Acid equivalent | Oxide equivalent |
|---|---|---|
| 0' | 0.200 | 0.400 |
| 20' | 0.028 | 0.228 |
| 30' | 0.010 | 0.213 |
| 60' | 0.001 | 0.196 |

The product was that of Example XVIII.

Example XX

To a solution of 24.5 g. (0.2 mol) benzoic acid in 62.5 g. methyl isobutyl ketone, there was added 6.5 g. trimethyl benzylammonium benzoate and the mixture was heated to 100° C. 31 g. (0.2 mol) 4-vinylcyclohexene dioxide, analyzing 90%, was then added to the heated mixture and the esterification allowed to proceed at 100° C. with the following results:

| Time | Acid equivalent | Oxide equivalent |
|---|---|---|
| 0' | 0.200 | 0.400 |
| 10' | 0.072 | 0.288 |
| 15' | 0.048 | 0.248 |
| 20' | 0.020 | 0.230 |
| 25' | 0.010 | 0.210 |

The product was a methyl isobutyl ketone solution of 4-vinylcyclohexene monohydroxy monobenzoate oxides.

Example XXI 24 g. (0.4 mol) acetic acid was dissolved in 64 g. methyl isobutyl ketone and 9 g. trimethylbenzylammonium acetate was added. The mixture was then heated to 110° C. at which temperature 31 g. (0.2 mol) 4-vinylcyclohexene dioxide, analyzing 90%, was quickly added and the di-esterification allowed to proceed. The following rate of esterification was observed:

| Time | Acid equivalent | Oxide equivalent |
|---|---|---|
| 0' | 0.400 | 0.400 |
| 30' | 0.129 | 0.106 |
| 60' | 0.061 |  |
| 90' | 0.044 | 0.025 |
| 120' | 0.031 |  |
| 150' | 0.023 | 0.007 |

The product was a solution of 4-vinylcyclohexene dihydroxy diacetates. It was dark in colour but stable.

Example XXII

To 34 g. (0.4 mol) crotonic acid dissolved in 75 g. cyclohexanone, there was added 10 g. trimethylbenzylammonium crotonate and the mixture was heated to 110° C. 31 g. (0.2 mol) 4-vinylcyclohexene dioxide, analyzing 90%, was then added and the esterification carried on at 110° C. with the following results:

| Time | Acid equivalent | Oxide equivalent |
|---|---|---|
| 0' | 0.400 | 0.400 |
| 60' | 0.045 | 0.065 |
| 120' | 0.032 | 0.056 |
| 180' | 0.025 | 0.041 |

The product was a solution of 4-vinylcyclohexene dihydroxy dicrotonates.

Example XXIII 54 g. (0.2 mol) stearic acid was heated to 110° C. with 1 g. trimethylbenzylammonium hydroxide as a 40% aqueous solution and 15.5 g. (0.1 mol) 4-vinylcyclohexene dioxide, analyzing 90%, was then added thereto. The temperature was thereafter readjusted to 110° C. and the di-esterification allowed to proceed with the following results:

| Time | Acid equivalent | Oxide equivalent |
|---|---|---|
| 0' | 0.200 | 0.200 |
| 30' | 0.069 | 0.066 |
| 45' | 0.049 | 0.045 |
| 60' | 0.036 | 0.030 |

The product was a wax consisting of 4-vinylcyclohexene dihydroxy distearates.

Example XXIV

To 108 g. (0.4 mol) stearic acid heated to 120° C. with 2 g. trimethylbenzylammonium hydroxide (40% aqueous solution), there was added 31 g. (0.2 mol) 4-vinylcyclohexene dioxide, analyzing 90%, and the reaction continued at 120° C. The following di-esterification rate was obtained:

| Time | Acid equivalent | Oxide equivalent |
|---|---|---|
| 0' | 0.400 | 0.400 |
| 15' | 0.095 | 0.097 |
| 30' | 0.045 | 0.051 |
| 60' | 0.010 |  |
| 90' | 0.002 | 0.000 |

The product, 4-vinylcyclohexene dihydroxy distearates, was a stable, neutral, low melting wax. Molecular weight: found 670, calculated 680. Active hydrogen: found 2.06, calculated 2.00 equivalents per 680 g.

Example XXV

A mixture of 57.5 g. (0.2 mol) stearic acid and 2.7 g. potassium hydroxide (50% aqueous solution) was prepared and heated to 120° C. 15.5 g. (0.1 mol) 4-vinylcyclohexene dioxide, analyzing 90%, was then added thereto and the di-esterification allowed to proceed at 120° C. with the following results:

| Time | Acid equivalent | Oxide equivalent |
|---|---|---|
| 0' | 0.200 | 0.200 |
| 15' | 0.087 | 0.087 |
| 30' | 0.059 | 0.059 |
| 60' | 0.036 | 0.036 |
| 90' | 0.016 | 0.016 |

The product was that of Example XXIII.

Example XXVI

The procedure of Example XXV was applied to 63.3 g. (0.2 mol) stearic acid, 0.5 g. lithium hydroxide and 15.5 g. (0.1 mol) 4-vinylcyclohexene dioxide, analyzing 90%. The following results were obtained:

| Time | Acid equivalent | Oxide equivalent |
|---|---|---|
| 0' | 0.200 | 0.200 |
| 15' | 0.105 | 0.102 |
| 30' | 0.083 | 0.079 |
| 60' | 0.067 | 0.061 |
| 90' | 0.056 | 0.048 |

A product similar to that of Example XXIII was obtained.

Example XXVII

A reaction similar to that of Example XXVI was conducted at 135° C. with the following results:

| Time | Acid equivalent | Oxide equivalent |
|---|---|---|
| 0' | 0.200 | 0.200 |
| 15' | 0.094 | 0.073 |
| 30' | 0.069 | 0.045 |
| 60' | 0.052 | 0.020 |
| 90' | 0.046 | 0.012 |

The waxy product was impure 4-vinylcyclohexene dihydroxy distearates.

Example XXVIII

To a mixture of 56 g. (0.2 mol) oleic acid and 1.0 g. trimethylbenzylammonium hydroxide heated to 120° C., there was added 15.5 g. (0.1 mol) 4-vinylcyclohexene dioxide, analyzing 90%, and the reaction was allowed to proceed at 120° C. The following results were obtained:

| Time | Acid equivalent | Oxide equivalent |
|---|---|---|
| 0' | 0.200 | 0.200 |
| 15' | 0.068 | 0.100 |
| 30' | 0.040 | 0.020 |
| 60' | 0.025 | 0.008 |

The viscous liquid product was 4-vinylcyclohexene dihydroxy dioleates.

Example XXIX 49 g. (0.4 mol) benzoic acid was dissolved in 90 g. methyl isobutyl ketone and 10 g. trimethylbenzylammonium benzoate was added thereto. The mixture was then heated to 100° C. at which temperature 31 g. (0.2 mol) 4-vinylcyclohexene dioxide, analyzing 90%, was added and the reaction continued at 100° C. The following results were obtained:

| Time | Acid equivalent | Oxide equivalent |
|---|---|---|
| 0' | 0.400 | 0.400 |
| 30' | 0.144 | 0.130 |
| 60' | 0.087 | 0.060 |
| 90' | 0.054 | 0.031 |
| 120' | 0.047 | 0.027 |
| 150' | 0.045 | 0.001 |

The product was a methyl isobutyl ketone solution of impure 4-vinylcyclohexene dihydroxy dibenzoates.

The monohydroxy monoester oxides may be used immediately without purification in further reaction involving the oxide and hydroxyl groups. Continued heating of these compounds, as illustrated in Examples VII, XI, XII and XV results in oxide lost presumably with the formation of a mixture of the unstable monohydroxy monoester oxides and their isomerized and polymerized forms. In the case of the monohydroxy monostearate oxides the product resulting from oxide loss has been found to have an increased molecular weight and has been observed to have reduced solubility in acetone and ether. The melt also is more viscous and crystallizes less readily than the monohydroxy monoester oxides.

Esterification at elevated temperatures (Example V) or with insufficient amount of catalyst (Example IV) or with an inefficient catalyst or any combination of the above conditions (Example IX) results in simultaneous esterification and oxide loss by intra-molecular isomerization, yielding a product of correct molecular weight and active hydrogen content but low in oxide as illustrated in Example IX.

The stability of monohydroxy monoester oxides derived from long chain acids is considerably enhanced by preparation in solution as illustrated in Example XIII. Such monohydroxy monoester oxide solution may be stored without change. The preparation of monohydroxide monoester oxides derived from some lower acids required both an inert solvent and higher catalyst concentration (about 8%) to avoid the side reactions which result in oxide loss. Unlike the similar products derived from long chain acids, such monohydroxy monoester oxide solutions are not stable.

Although temperatures of from 100° to 150° C. are suitable for effecting the esterification, a range of 110°–120° C. is preferred inasmuch as lower values require further heating of the reactants and higher values require greater concentrations of catalysts.

Other catalysts than those mentioned in the previous examples are suitable for the operation of this invention. Examples of such catalysts are the strong inorganic bases other than potassium hydroxide and the strong organic bases such as amidines, N-alkyl guanidines and quaternary ammonium compounds other than tetramethylammonium hydroxide and trimethylbenzylammonium hydroxide.

The monohydroxy monoester oxides and dihydroxy diesters of this invention may be further reacted with monocarboxylic acids to give tri and tetra esters. When reacted with dicarboxylic acids, they yield linear or cross-linked polyesters containing ester side-chains which are structurally related to the modified alkyd resins and the similar resins based on pentaerythritol.

The monohydroxy monoester oxides of the invention may also be reacted with acid anhydrides to yield polyesters. In the case of monoesters derived from unsaturated acids, the reaction with anhydrides may lead to drying resins.

The esters of this invention are also useful as plasticizers and lubricating agents.

Having thus described our invention what we claim is:

1. A process for preparing monohydroxy monoester oxides which comprises reacting one mol of 4-vinylcyclohexene dioxide with one mol of long chain fatty acid at a temperature of from 100° C. to 150° C. and in the presence of at least 1% by weight of the reaction mixture of a catalyst selected from the group consisting of potassium hydroxide, lithium hydroxide, tetramethylammonium hydroxide and trimethylbenzylammonium hydroxide.

2. A process for preparing monohydroxy monoester oxides which comprises reacting one mol of 4-vinylcyclohexene dioxide with one mol of long chain fatty acid at a temperature of from 110° C. to 120° C. and in the presence of at least 1% by weight of the reaction mixture of a catalyst selected from the group consisting of potassium hydroxide, lithium hydroxide, tetramethylammonium hydroxide and trimethylbenzylammonium hydroxide.

3. A process for preparing monohydroxy monoester oxides which comprises reacting one mol of 4-vinylcyclohexene dioxide with one mol of long chain fatty acid at a temperature of from 110° C. to 120° C. and in the presence of at least 1% by weight of the reaction mixture of trimethylbenzylammonium hydroxide.

4. A process for preparing monohydroxy monoester oxides which comprises reacting one mol of 4-vinylcyclohexene dioxide with one mol of stearic acid at a temperature of from 110° C. to 120° C. and in the presence of at least 1% by weight of the reaction mixture of trimethylbenzylammonium hydroxide.

5. A process for preparing monohydroxy monoester oxides which comprises reacting one mol of 4-vinylcyclohexene dioxide with one mol of oleic acid at a temperature of from 110° C. to 120° C. and in the presence of at least 1% by weight of the reaction mixture of trimethylbenzylammonium hydroxide.

6. A process for preparing monohydroxy monoester oxides which comprises reacting one mol of 4-vinylcyclohexene dioxide with one mol of linseed oil acid at a temperature of from 110° C. to 120° C. and in the presence of at least 1% by weight of the reaction mixture of trimethylbenzylammonium hydroxide.

GORDON HART SEGALL.
OWEN CLEMENT WENTWORTH ALLENBY.

REFERENCES CITED

The following references are of record in the file of this patent:

UNITED STATES PATENTS

| Number | Name | Date |
|---|---|---|
| 2,089,569 | Orthner | Aug. 10, 1937 |
| 2,131,142 | Orthner | Sept. 27, 1938 |

OTHER REFERENCES

Goldsmith, pp. 274 and 275, Chemical Reviews, vol. 33, No. 3, December 1942.